Dec. 19, 1967  J. W. BROWN  3,358,556
KALEIDOSCOPE PROJECTOR
Filed Oct. 5, 1966  5 Sheets-Sheet 1
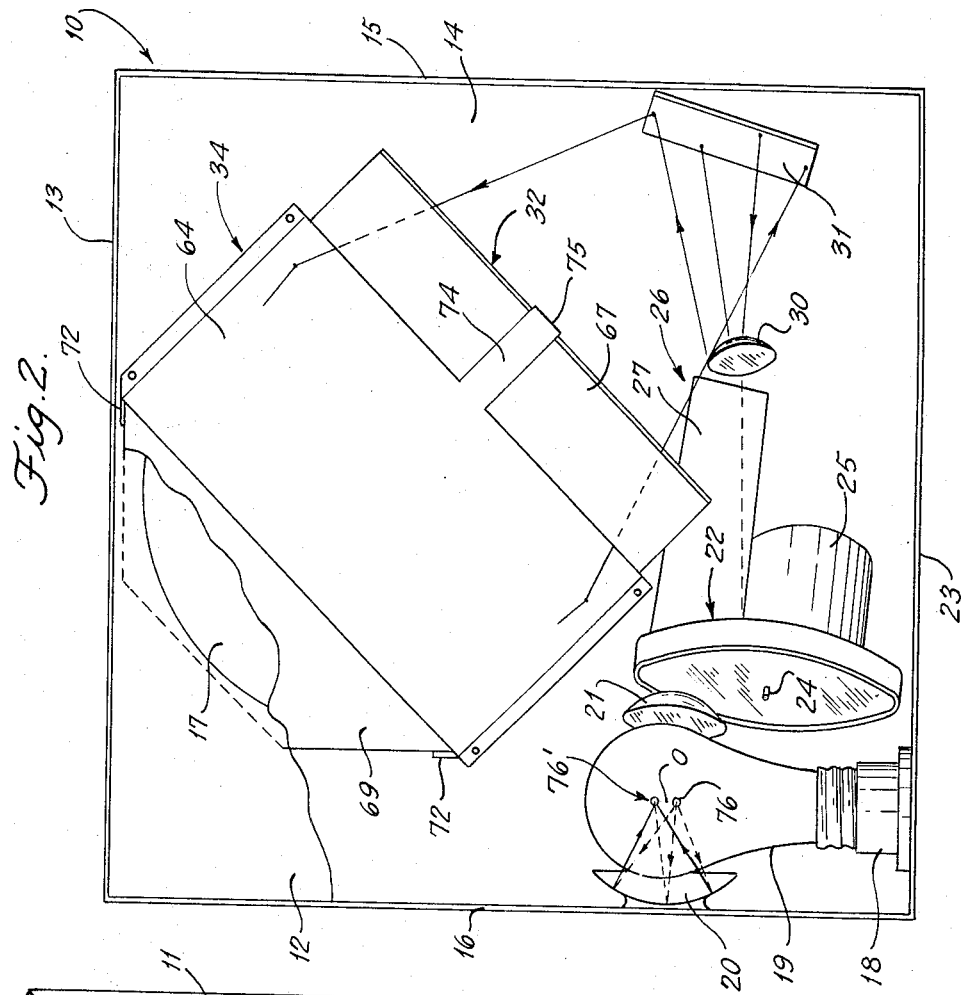
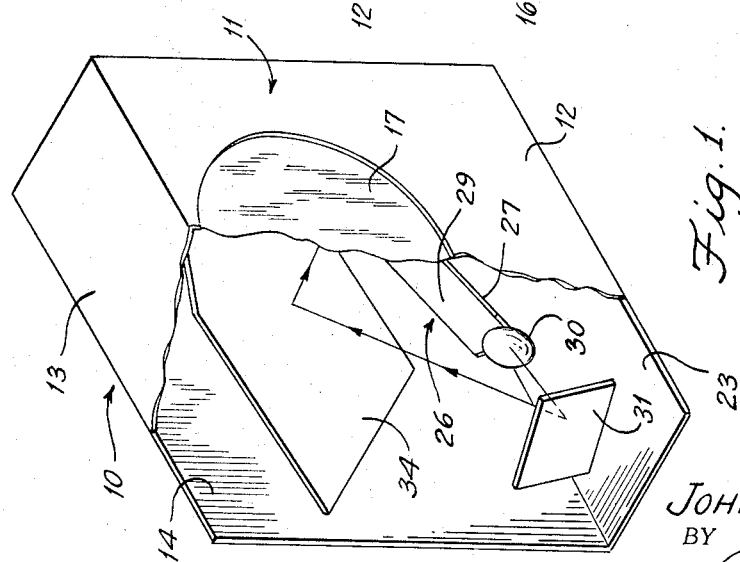
INVENTOR.
JOHN W. BROWN
BY
Albert M. Parker
ATTORNEY.

Dec. 19, 1967  J. W. BROWN  3,358,556
KALEIDOSCOPE PROJECTOR
Filed Oct. 5, 1966  5 Sheets-Sheet 2

INVENTOR.
JOHN W. BROWN
BY
Albert M. Parker
ATTORNEY.

Dec. 19, 1967  J. W. BROWN  3,358,556
KALEIDOSCOPE PROJECTOR
Filed Oct. 5, 1966  5 Sheets-Sheet 3

INVENTOR.
JOHN W. BROWN
BY Albert M. Parker
ATTORNEY.

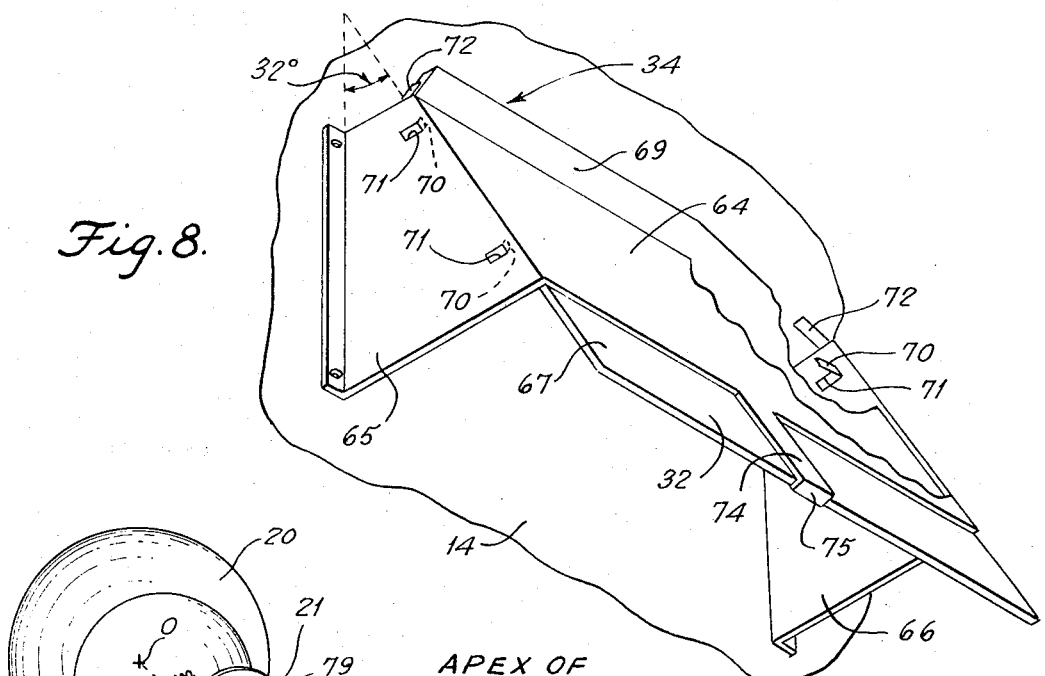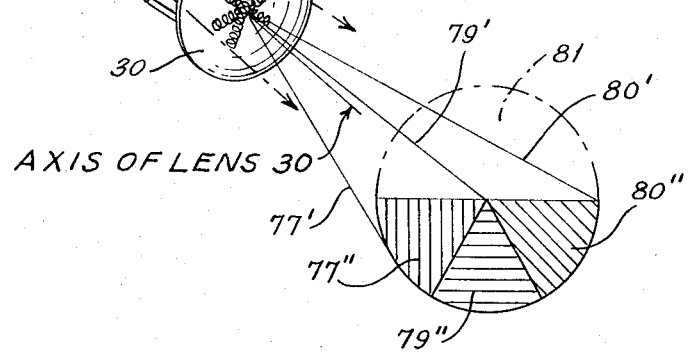

Dec. 19, 1967       J. W. BROWN       3,358,556
KALEIDOSCOPE PROJECTOR
Filed Oct. 5, 1966       5 Sheets-Sheet 5

INVENTOR.
JOHN W. BROWN
BY
Albert M. Parker
ATTORNEY.

3,358,556
KALEIDOSCOPE PROJECTOR
John W. Brown, c/o Brown Manufacturing Company,
P.O. Box 201, New Hope, Pa. 18938
Filed Oct. 5, 1966, Ser. No. 584,411
13 Claims. (Cl. 88—24)

This invention relates to a kaleidoscope projector, for projecting multiple images of ever-changing patterns, and to an improved illuminating system for such projector.

The kaleidoscope projector of the present invention, which may be employed to project images upon a wall or a screen at a distance therefrom may be employed for purposes of decoration, for attracting attention, or for advertising. In the latter such use advertising indicia, slogans, and symbols may be among the image-producing means employed with the projector. As indicated, the projector of the invention may be employed in connection with a projection screen or the like, particularly in darkened areas. It may, however, be employed with a translucent screen upon which the images are projected and through which they are viewed. A projector of the latter type is shown herein for illustrative purposes.

The invention has among its objects the provision of an improved kaleidoscope projector of simplified rugged construction which may be readily adapted for use as either a self-contained projector carrying its own viewing screen or a projector employed with a projection screen spaced therefrom.

A further object of the invention lies in the provision of an improved illuminating system for an optical projector, such system being particularly useful in a kaleidoscope projector and insuring the production of a projected image which is substantially uniformly illuminated over its entire extent.

Yet another object of the invention lies in the provision of a novel illuminating system of the character indicated in the paragraph immediately above, such system permitting the use of a conventional single filament electric lamp as the light source therefor.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in front perspective on a small scale of an illustrative preferred embodiment of kaleidoscope projector in accordance with the invention, a portion of the housing of the projector and of the translucent viewing screen being broken away for clarity of illustration;

FIG. 2 is a view in elevation of the projector of FIG. 1 taken from the side of the projector remote from the reader in FIG. 1, the wall of the housing at such side being removed;

FIG. 4 is a view in front elevation of the projector, the front of the housing being removed;

FIG. 8 is a view in perspective of the support for holding the large upper mirror of the projector;

FIG. 9 is a schematic view in perspective of the illuminating system and of the kaleidoscope system per se of a projector made in accordance with the prior art;

Figure 3:
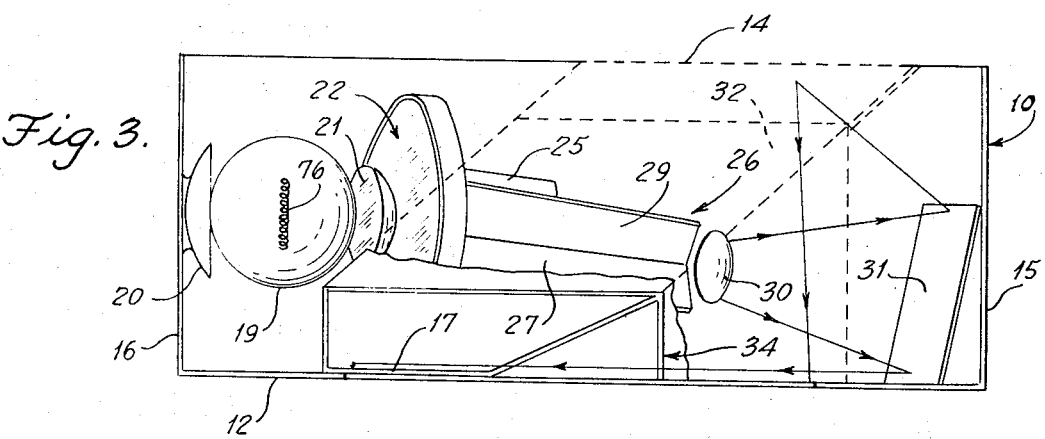
FIG. 3 is a view in plan of the projector of FIGS. 1 and 2, the top of the housing having been removed.

The general organization and manner of operation of the kaleidoscope projector of the invention will be apparent upon consideration of FIGS. 1–5, inclusive. Such projector, which is designated generally by the reference character 10, has a housing 11 which may be in the form of a carrying case, such housing having spaced parallel sidewalls 12 and 14, front and rear walls 15 and 16, a base 23, and a top 13. Forming a part of the wall 11 is a translucent viewing screen 17 upon the inner surface of which images are projected in a manner to be described, such images being viewed from outside the housing. As shown in FIGS. 2, 3, and 4, the projector is provided with a socket 18 mounted on the base 23, such socket supporting an electric lamp or light bulb 19 of conventional construction. Mounted upon the rear wall 16 of the housing generally behind the filament-containing portion of the lamp 19 is a part-spherical mirror 20. Mounted in front of the lamp and centered on the optical axis of the system is a lens 21 which gathers the direct and reflected rays and projects them through a rotating pattern-producing wheel or drum 22. Lens 21 is here shown as a planoconvex lens, with the plane face 82 confronting the light source. Drum 22, to be described in detail hereinafter, is mounted upon a shaft 24 which is driven at relatively slow speed by a geared motor 25.

After passing through the drum 22, the light passes longitudinally of a kaleidoscope 26 which is formed by two elongated plane mirrors 27 and 29 which meet along a line and are disposed at an angle with respect to each other. The value of such angle determines the number of images which are repeated in the pattern projected upon the screen 17. In this instance the angle between the mirrors 27 and 29 is 60°, and thus the pattern projected upon the screen contains six similar sector-shaped images. Upon emerging from the forward end of the kaleidoscope 26, the rays pass through a projection lens 30 and fall upon a first small mirror 31 located at the forward end of the housing adjacent the lower portion thereof by a suitable bracket. The pattern received by the mirror 31 is reflected upwardly and somewhat rearwardly onto a larger angularly disposed mirror 32 which in turn reflects it onto the inner surface of the translucent viewing screen 17. Mirror 32 is mounted upon a bracket 34, to be described, such bracket being secured to the wall 14 of the housing 11 of the projector. The bracket 34 and its manner of mounting upon the wall 14 of the housing are particularly illustrated in FIG. 8. Such bracket has a main body 64 in the form of a flat plate from which there extend in the same direction parallel legs 65 and 66 in the form of truncated triangles. The sides of the legs 66 and 67 remote from the plate 64 are provided with rearwardly and forwardly bent flanges by means of which the bracket is bolted to the wall 14. The mirror 32 is mounted upon the bracket so as to underlie and extend parallel to the plate 64, as shown, the outer edge of the mirror, which extends somewhat beyond the plate 64, being engaged and held by a depending finger 75 on the outer free end of a central arm 74 projecting from the plate 64.

The rear end portion of the mirror 32 which is of truncated triangular shape, extends into substantial contact with the wall 14 of the housing. The mirror is further retained in place by a plurality of upbent tabs 70 which are punched from the stock of the legs 65 and 66 at the locations 71, such tabs underlying the edges of the mirrors and retaining it in place. In order to retain the mirror 32 firmly against the finger 75, bracket 34 is further provided with longitudinally extending wings 72 which are formed from the stock of the legs 65 and 66 and overlie the rear edges of the mirror.

Figure 5:
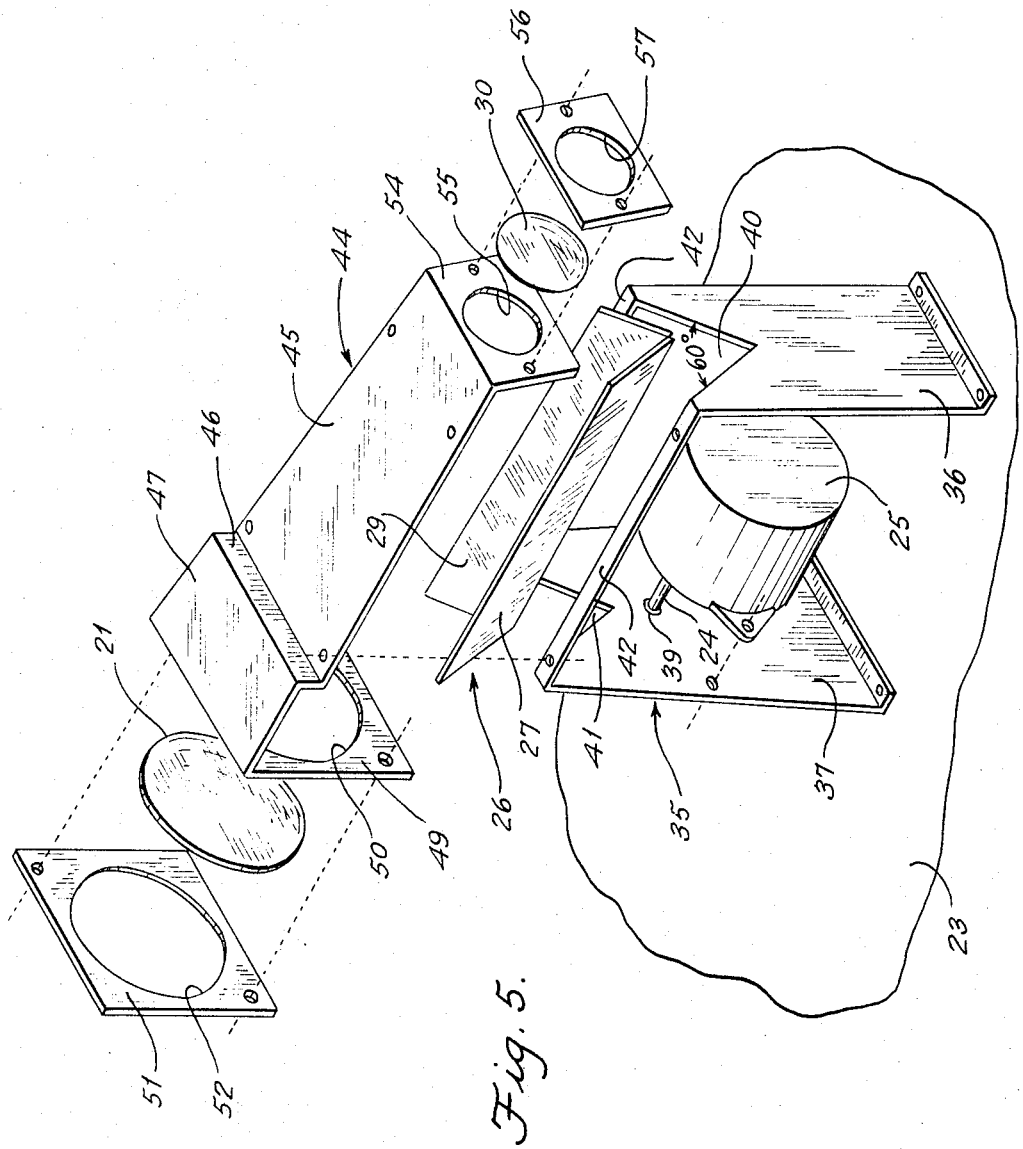
FIG. 5 is an exploded view in perspective of the main internal parts of the projector, the housing being omitted except for a portion of the base plate thereof.

The kaleidoscope 26, motor 25, drum 22, as well as the lenses 21 and 30, are mounted upon a main bracket 35 which is secured to the bottom 23 of the housing, as shown in FIG. 5. Bracket 35 has a forward vertical leg 36 and a rear leg 37 spaced therefrom and parallel thereto. The rear leg 37 contains a hole 39 therethrough, such hole receiving the shaft 24 of the geared motor 25. Motor 25 is mounted upon the forward face of the leg 37 and between it and the forward leg 36, as shown. The upper ends of the legs 36 and 37 are provided with deep V-shaped notches 40 and 41, respectively, such notches having in this instance an apex angle of 60° and being disposed symmetrically with respect to the longitudinal vertical plane through the bracket. As shown, the upper edges of each of the legs 36 and 37 are connected by longitudinally extending laterally spaced members 42 which may be formed integral with the legs. The elongated plane mirrors 27 and 29, which are silvered on their inner surfaces, are disposed within the notches 40 and 41 with their lower inner edges in contact.

Overlying the upper edges of the mirrors 27 and 29 and secured to the connecting members 42 is an upper bracket 44 which has a main horizontal plate portion 45 which with the mirrors 27 and 29 forms a kaleidoscope tube.

The bracket 44 is contained rearwardly of the kaleidoscope tube in an upstanding portion 46, an elevated horizontal portion 47, and a depending vertical portion 49, the latter portion having a large hole 50 therethrough in which the condensing lens 21 is mounted. The lens 21 is retained in place by a rear plate 51 having a central hole 52 therethrough, plate 51 being mounted parallel to the portion 49 of the bracket 44 and being retained thereon by bolts (not shown).

Forwardly of the plate 45, the bracket 44 is bent downwardly into a depending forward plate 54 having a large central hole 55 therethrough. The projecting lens 30 is mounted over such hole 55 and is retained in place by a plate 56 having a lens receiving central opening 57 therethrough, the plate 56 also being secured to the bracket portion 54 by bolts (not shown).

Figure 6:
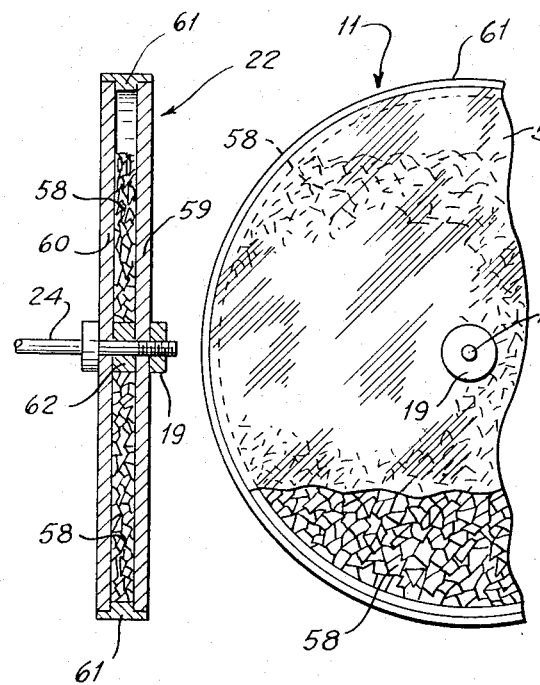
FIG. 6 is a view in vertical transverse diametral section through the pattern creating drum of the projector.
Figure 7:
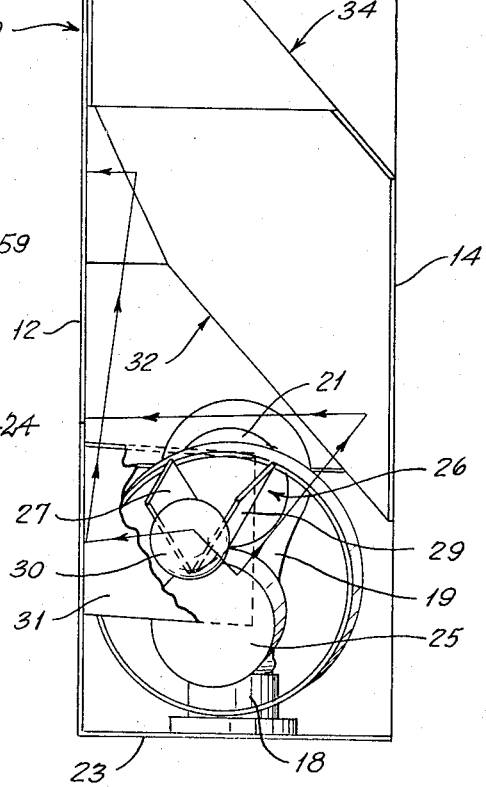
FIG. 7 is a fragmentary view in end elevation of the drum of FIG. 6, the view being taken in the direction from right to left in FIG. 6.

The pattern-producing drum 22, which is shown more particularly in FIGS. 6 and 7, includes two spaced parallel transparent circular plates 59 and 60 which are centrally mounted upon the rear end of the shaft 24 as shown. The space between the plates 59 and 60 is centrally closed by a spacer washer 62 which is telescoped over the shaft 24 and is closed at its periphery by a rim member 61 which has a shallow central inwardly projecting annular flange received between the peripheral edges of the plates. The image-producing means are in the form of a plurality of bodies 58 which may be either opaque if the image is to be a silhouette or transparent or at least translucent if the image is to be formed by light transmitted therethrough. The bodies 58 substantially fill the space between the plates 59 and 60, the bodies 58, however, being free to move relatively to each other as the drum is rotated so that their projected images constantly change during the operation of the projector.

The optical system of the invention is perhaps best understood by first considering a prior art optical system for a kaleidoscope projector and the difficulties attendant thereon. Such prior system is shown schematically in FIG. 9. This system is provided, as is the preferred embodiment of the present invention shown herein, with a conventional clear incandescent lamp or light bulb 19 having a single horizontal filament 76 therein. In the system shown in FIG. 9, the bulb 19 has the horizontally central point of the filament 76 lying in the longitudinal vertical plane containing the line 79 of intersection between the inner surfaces of the mirrors 27 and 29 forming the kaleidoscope tube, the center O of the part-spherical reflector 20 likewise lying in such plane.

With the prior art system shown in FIG. 9, wherein the mirrors 31 and 34 have been eliminated for simplicity, only the lower half of the projected image is completely illuminated, so that the projected image is generally in the form of a half circle, the remainder of the circle remaining either unilluminated or at best very dimly illuminated. There are thus shown reproduced upon the surface on which the image is projected only three of the desired theoretically possible six repetitive images. A first such sector-shaped image is designated 77''; such image is formed by one set of rays from the filament 76, of which one ray 77 is shown travelling from the outer portion of the filament 76 nearer the reader in FIG. 9 and along the kaleidoscope tube, being reflected once therein to emerge as a ray, now designated 77', from the projecting lens 30. The lower, central image 79'' is formed by another set of rays, the central one of which travels along the line of intersection of the mirrors 27 and 29 and which is thus also designated 79 before its impingement upon the projecting lens 30, such central ray being designated 79' as it travels from such lens to the screen. The ray 79 travels directly from the horizontal center of the filament 76 through the kaleidoscope tube without any reflections in such tube. The remaining image 80'' is formed by rays of which a typical one is shown at 80 in advance of the projecting lens 30 and 80' after it leaves such lens. Ray 80 travels from the outer portion of the filament 76 further from the reader in FIG. 9 and along the kaleidoscope tube, being reflected once therein before it emerges to impinge upon lens 30. The system of FIG. 9 provides no definite sets of rays for the illumination of the part-circular area, 81, indicated by the dash line half-circle in FIG. 9, above the projected images 77'', 79'', and 80''. At best, such area is only dimly illuminated by random rays, as those from the bordering edges of the filament. It can thus be seen that a kaleidoscope projector in accordance with the prior art system of FIG. 9 is unsatisfactory when employed with a conventional, economical lamp bulb.

In order to overcome such defect in prior art systems, it has been proposed to employ special lamp bulbs employing a plurality of filaments as the light source therefor. Such special lamp bulbs, which are fairly expensive, are so positioned relative to the optical axis of the illuminating system of the projector as to illuminate the portion of the image which is missing in the system of FIG. 9. It will now be clear upon consideration of FIGS. 10 and 11, which show the optical system in accordance with the present invention, that the invention makes possible the complete illumination of the area of the projected image while using the same conventional single filament lamp bulb 19 as shown in FIG. 9.

Figure 10:
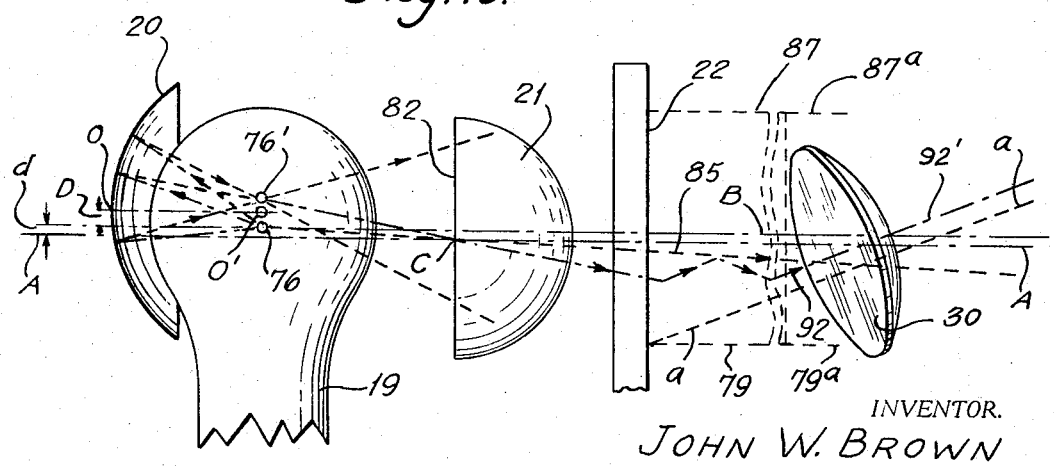
FIG. 10 is a schematic view in side elevation of the illuminating system of the present invention.

The optical system of the invention may be considered with the condensing lens 21 as the starting point, the other elements of the system being correlated with the lens 21 as follows: The center of the rear, plane face 82 of lens 21, such center being designated C in FIG. 10, is disposed on the axis A—A of the kaleidoscope system, such axis lying in the longitudinal vertical plane containing the line 79 of intersection between the inner surfaces of the mirrors 27 and 29, and being parallel to line 79, passing through the center of the dotted line triangle shown in FIG. 9 at the rear, light entering end of the kaleidoscope tube, such triangle being formed by the rear edges of the mirrors 27 and 29 and the line passing chordally of the periphery of the pattern wheel 22 through the intersections of the pattern wheel and the rear edges of mirrors 27 and 29 projected. The lamp 19 is disposed with its filament 76 horizontal and with the longitudinal center of such filament in the longitudinal vertical plane containing axis A—A of lens 21. The vertical center of filament 76 is disposed a short distance $d$ above the axis A—A and a short distance D below the horizontal line, O—O' in said central longitudinal vertical plane parallel to the axis A—A and passing through the center O of the reflector 20. In the embodiment shown, the distance D slightly exceeds the distance $d$, although this relationship is capable of some variation. In any event the values D and $d$ are of the same order of magnitude.

As a result of such positioning of the filament 76 of the lamp 19 and the reflector 20, in the operation of the system there is produced an image 76' of the actual filament 76, such image 76' being a real image and lying substantially in the vertical plane of filament 76, the lateral centers of the two images lying equidistant from and on opposite sides of the center O' of the center of curvature of the mirror 20, point O' lying in the same horizontal line O—O' as the center O of the reflector 20. The actual filament 76 and its real image 76', when taken with the angular displacement of the projecting lens 30 now to be described, result in the complete illumination of the projected image, that is, in the embodiment shown, six repetitive sector-shaped images which are all substantially uniformly illuminated.

In order to produce this result, the projection lens 30 is disposed in the position shown in FIG. 10. Thus in accordance with the present invention the center of the lens 30 lies in the central longitudinal vertical plane through the kaleidoscope tube, such plane containing the line 79 of intersection between the inner surfaces of the plane mirrors 27 and 29. The projection lens 30 is also tipped with respect to a vertical plane normal to the longitudinal axis of the kaleidoscope tube through such angle that the optical axis of the lens 30 lies midway between a straight line 85 between the center of lens 30 and the laterally central point of filament 76 and the plane containing a further pair of lines 91 and 92 along which the rays from the outer end portions of the image 76' of the filament travel toward lens 30 after their last reflection in the kaleidoscope tube. For practical purposes, to achieve the desired positioning of the optical axis of lens 30 such axis $a$—$a$ may be positioned in the central vertical longitudinal plane of the kaleidoscope tube and passes through the line 79 of intersection of the mirrors 27 and 29 at the rear, light entering ends of the mirrors furthest from lens 30, as shown in an exaggerated manner in FIG. 10 wherein the kaleidoscope is foreshortened.

Finally, the lens 30 is disposed vertically so that its center lies somewhat above the projection 79a of the line 79, that is, the line of intersection between the inner surfaces of mirrors 27 and 29. Although the theoretical placement of lens 30 ideally would be with its center lying on the forward extension of the line of intersection of mirrors 27 and 29, such an arrangement cuts down the aperture or area of lens available for use. Therefore, the lens must, as a practical matter, be moved upwards to render more of the lens useful and allow more of the lens to be used and let more light through. In the embodiment shown, the lens 30 is raised somewhat from its theoretically ideal position, the lower edge of the lens 30 extending a short distance below the projection 79a of the line 79 of intersection of mirrors 27 and 29; the lens 30 which is shown employed in the system has its upper edge lying somewhat below the level of the projections 87a of the upper edges 87 of mirrors 27 and 29.

As a result of the above described disposition of the parts, the composite image projected by the system of the invention not only includes the same three bottom sector-shaped images 77", 79', and 80" as are shown in the prior art system of FIG. 9, but also includes three further upper sector-shaped images designated 89", 90", and 86", such three further images being mirror images of and lying opposite images 77", 79", and 80", respectively.

Figure 11:
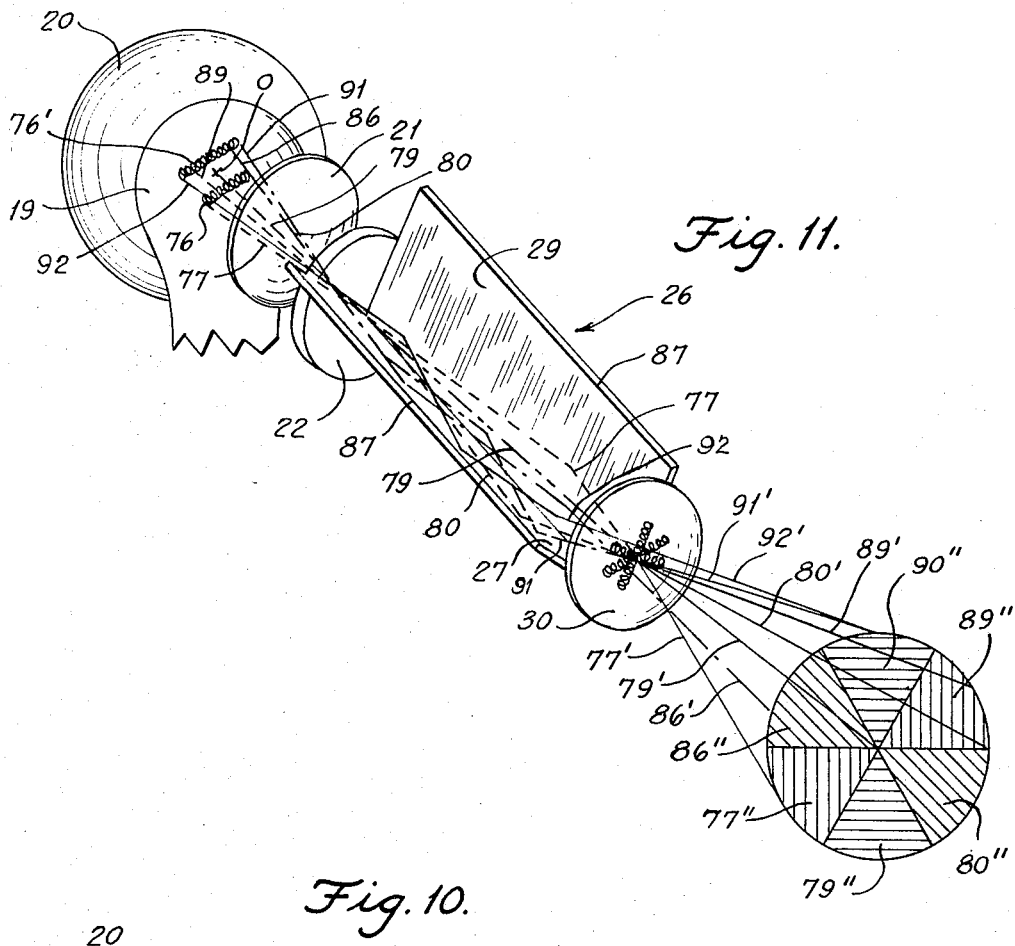
FIG. 11 is a schematic view in perspective similar to FIG. 9 but illustrating the illuminating system of the present invention employed in connection with a kaleidoscope.

Thus with the system shown in FIGS. 10 and 11 with the reflector 20, lamp 19, condensing lens 21, the kaleidoscope tube, and the projection lens 30 disposed as above described, the entire area of the projected composite image is substantially uniformly illuminated. Rays from the actual filament 76 not only travel directly to the condensing lens 21, pass through such condensing lens, through the image wheel 22, the kaleidoscope tube, and the projection lens 30 and illuminate the lower half of the projected image but they travel rearwardly to impinge upon the inner reflecting surface of the reflector 20. Such rays reflected by the reflector 20 then travel forwardly so that they all pass substantially through a horizontal line vertically above the actual filament 76 to form the above described real image 76' of the filament. From the image 76' of the filament, such reflected rays travel forwardly to impinge upon the condensing lens 21, then pass through the image wheel 22, and then after travel through the kaleidoscope tube pass through the projection lens 30, and merge to form an upper half of the projected composite image. In operation with an efficient reflector 20 and a clear thin walled single filament bulb 19 the illuminations of the lower and upper halves of the projected composite image are substantially the same.

In FIGS. 10 and 11 the manner of illumination of the three lower sectors is shown as being the same as in FIG. 9. In FIGS. 10 and 11 there is also shown the manner in which the optical system of the invention functions to produce the upper illuminated sectors 86" and 89" of the composite six-sectored image. Thus the ray 86 is shown travelling forwardly from the more centrally located portion of the end of the real image 76' of the filament which is remote from the reader in FIG. 11 to pass through the condensing lens 21 and the image wheel 22 and to enter the kaleidoscope tube. Such ray 86 then impinges upon and is reflected by the mirror 27 and the mirror 29, and after such two reflections emerges from the kaleidoscope tube to enter the projection lens 30. From lens 30 such ray, now designated 86', travels upwardly and to the left (FIG. 11) to form, with related rays, the projected image 86".

The projected image 89" is similarly formed, but by rays travelling forwardly from the more centrally located portion of the end of the real image 76' of the filament which is nearer the reader in FIG. 11. Thus a typical one of such rays, which is designated 89, travels forwardly through the condensing lens 21 and image wheel 22 to enter the kaleidoscope tube. Such ray 89 then impinges upon and is reflected by the mirror 29 and the mirror 27, in that order, emerging from the kaleidoscope tube after such two reflections to enter the projection lens 30. From lens 30 such ray, now designated 89', travels upwardly and to the right (FIG. 11) to form, with related rays, the projected image 89".

The central upper projected image 90" is produced by the combined effects of first further rays travelling from the outer end of the real image 76' of the filament which is remote from the reader in FIG. 11 and of second further rays travelling from the outer end of the real image 76' of the filament which is nearer the reader in FIG. 11. A typical one of such first further rays is designated 91 in FIG. 11, and a typical one of such second further rays is designated 92. Such further rays, travelling from opposite ends of the real image 76' of the filament, travel forwardly to pass through the condensing lens 21 and the image wheel 22, and enter the kaleidoscope tube, first impinging upon and being reflected by the mirrors 27 and 29, respectively. After two further reflections by the mirrors of the kaleidoscope tube, such rays emerge to pass through the projection lens 30. After leaving lens 30, the described two sets of further rays, now designated 91' and 92', respectively, converge as shown so that they are superimposed upon the projection screen or surface and form the single upper central illuminated image sector 90".

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

Thus, as is clear from the above, with a two-filament light bulb as described, it is immaterial whether the true filament is disposed in the position of the upper or the lower luminous zone. Further, although the initial source of light of the light source of the system of the invention has been shown and described as having two filaments, it is to be understood that in accordance with the invention an initial light source having more than two filaments may be employed so long as they yield luminous zones at the required points or positions. It is also to be understood that when a light bulb having a multiplicity of filaments, as, for example, six or eight filaments, is employed, it is immaterial whether such filaments are disposed vertically or horizontally, since such filaments yield luminous zones at the required points. As with the illustrative system in accordance with the invention, when the filament system of the light bulb has more than two filaments, or has a multiplicity of filaments, the filament system must be disposed above the axis A—A of FIG. 11.

The invention is clearly defined in the appended claims. Where parts are, for clarity and convenience, referred to on the basis of their oriented position shown in the accompanying drawing, no limitation as to positioning of the entire structure is to be implied, since it will be understood that the entire structure may be inverted or that it may be used in any inclined position. Also, in both the description and the claims, parts at times may be identified by specific names for clarity and convenience, but such nomenclature is to be understood as having the broadest meaning consistent with the context and with the concept of the invention as distinguished from the pertinent prior art.

What is claimed is:

1. A kaleidoscope projector apparatus having a kaleidoscope eyetem including a horizontal kaleidoscope tube, a projection lens at the forward end of the tube, and means rearwardly of the tube for projecting an image thereinto, said last named means comprising a light source, and an image forming means arranged so that light from the light source passes through the image forming means and into the rear end of the kaleidoscope tube, the light source having means providing first and second elongated luminous zones along vertically spaced generally parallel generally horizontal lines passing through the central longitudinal vertical plane through the kaleidoscope tube, one of such luminous zones being spaced a short distance vertically from the central longitudinal optical axis of the kaleidoscope system, rays passing from said first and second luminous zones through the kaleidoscope tube and substantially uniformly illuminating the entire area of the multiple image projected by the apparatus.

2. An apparatus as claimed in claim 1, wherein the lower, first one of said luminous zones is disposed above the central longitudinal optical axis of the kaleidoscope system.

3. An apparatus as claimed in claim 2, wherein the other, second luminous zone is spaced in the same direction as but further from the central optical axis of the kaleidoscope system than said first luminous zone.

4. An apparatus as claimed in claim 3, wherein the first and second elongated luminous zones are disposed generally symmetrically with respect to said longitudinal vertical plane through the kaleidoscope tube.

5. An apparatus as claimed in claim 4, wherein the kaleidoscope tube comprises two elongated plane mirrors each inclined downwardly and inwardly at equal angles and meeting at an elongated horizontal line of intersection in said longitudinal vertical central plane through the kaleidoscope tube, the projection lens being disposed with its center above said line of intersection of the mirrors and being tipped so that the upper edge of such lens lies rearwardly of its lower edge.

6. An apparatus as claimed in claim 5, wherein the light source includes a condensing lens disposed rearwardly of the image forming means, and the axis of the projection lens lies substantially mid-way between a first line, which is a straight line through the lateral center of the lower horizontal luminous zone of the light source and the center of the rear surface of the condensing lens, and the plane containing a further pair of lines along which the rays from the outer end portions of the upper luminous zone travel toward the projection lens after their last reflection in the kaleidoscope tube.

7. An apparatus as claimed in claim 1, wherein the light source comprises an initial source of light and a reflector, said initial source of light providing said first horizontally elongated luminous zone, and the reflector being positioned rearwardly of the initial source of light, said reflector cooperating with the initial source of light to provide a real image of said first horizontal luminous zone of the initial light source, said real image being the said second horizontal luminous zone of the light source.

8. An apparatus as claimed in claim 7, wherein the reflector is curved in a vertical direction.

9. An apparatus as claimed in claim 7, wherein the reflector is part-spherical.

10. An apparatus as claimed in claim 7, wherein said initial source of light has only one luminous zone.

11. An apparatus as claimed in claim 10, wherein the light source is an incandescent electric light bulb having a horizontal filament, said filament directly providing one of said luminous zones, and a curved reflector positioned rearwardly of the light bulb, said reflector cooperating with the light bulb to provide a real image of said filament, said real image being the other luminous zone of the light source.

12. An apparatus as claimed in claim 11, wherein the reflector is part-spherical and is disposed with its center of curvature vertically mid-way between the filament and the real image of the filament.

13. An apparatus as claimed in claim 12, wherein the incandescent electric light bulb has a single horizontal filament, said filament directly providing said first luminous zone.

References Cited
UNITED STATES PATENTS

| | | | |
|---|---|---|---|
| 1,596,481 | 8/1926 | Debrie | 240—41.25 |
| 2,180,031 | 11/1939 | Carlson | 88—24 |
| 2,195,392 | 3/1940 | Van Alphen | 88—24 |
| 2,762,257 | 9/1956 | Nee Vacher | 88—24 |

JOHN M. HORAN, *Primary Examiner.*

NORTON ANSHER, *Examiner.*

J. W. PRICE, *Assistant Examiner.*